United States Patent [19]
Chubb et al.

[11] Patent Number: 6,070,696
[45] Date of Patent: Jun. 6, 2000

[54] ADJUSTABLE LEG SUPPORT ASSEMBLY

[75] Inventors: Arthur B. Chubb, Romulus; Douglas G. Break, Livonia; Daniel J. Spencer, Belleville; James E. Suyak, Lincoln Park, all of Mich.

[73] Assignee: Tapco International Corporation, Plymouth, Mich.

[21] Appl. No.: 08/840,225

[22] Filed: Apr. 11, 1997

Related U.S. Application Data

[60] Continuation-in-part of application No. 08/484,977, Jun. 7, 1995, Pat. No. 5,651,298, which is a division of application No. 08/372,824, Jan. 13, 1995, abandoned, which is a continuation of application No. 08/030,638, Mar. 12, 1993, abandoned, which is a continuation-in-part of application No. 07/840,319, Feb. 24, 1992, abandoned.

[51] Int. Cl.[7] ..................................................... E04G 1/32
[52] U.S. Cl. ................... 182/227; 182/181.1; 182/182.1; 182/225
[58] Field of Search ................................ 182/153, 181.1, 182/182.1, 182.2, 185.1, 224, 225, 227, 109, 111, 186.2, 186.5, 186.7, 186.8; 248/163.1, 166, 170, 171, 177.1, 188.6, 188.7, 188.8, 188.9, 188.91; 396/436, 419, 428

[56] References Cited

U.S. PATENT DOCUMENTS

| | | | |
|---|---|---|---|
| D. 325,679 | 4/1992 | O'Mealy et al. | 248/170 X |
| 1,175,522 | 3/1916 | Horn | 182/227 |
| 1,356,749 | 10/1920 | Sorg | 182/227 X |
| 1,439,068 | 12/1922 | Collier | 182/227 |
| 2,427,540 | 9/1947 | Wierowski | 182/227 X |
| 2,589,554 | 5/1952 | Killian . | |
| 2,632,483 | 3/1953 | Jamack . | |
| 2,708,952 | 5/1955 | Blackwell . | |
| 2,735,455 | 2/1956 | Forsberg . | |
| 2,739,624 | 3/1956 | Haddock . | |
| 3,130,758 | 4/1964 | McKinley . | |
| 3,235,215 | 2/1966 | Lodde, Jr. | 248/170 X |
| 3,483,901 | 12/1969 | Ray . | |
| 3,618,883 | 11/1971 | Cohn | 248/166 X |
| 3,821,918 | 7/1974 | Niehaus . | |
| 4,016,649 | 4/1977 | Kloster . | |
| 4,031,981 | 6/1977 | Spencer | 182/227 X |
| 4,079,648 | 3/1978 | Chappell . | |
| 4,155,383 | 5/1979 | Welliver . | |
| 4,197,775 | 4/1980 | Handler . | |
| 4,452,117 | 6/1984 | Brickner . | |
| 4,516,453 | 5/1985 | Parham, Jr. . | |
| 4,608,761 | 9/1986 | Small . | |
| 4,756,386 | 7/1988 | Blanchard | 182/227 X |
| 4,807,506 | 2/1989 | Audet . | |
| 4,988,064 | 1/1991 | Hoshino | 248/170 |
| 4,995,288 | 2/1991 | DellaPolla . | |
| 5,137,236 | 8/1992 | Burns | 248/188.6 X |
| 5,267,712 | 12/1993 | Shen | 248/188.7 X |
| 5,308,029 | 5/1994 | Bingham | 248/170 X |
| 5,794,899 | 8/1998 | Tamllos | 248/166 |

*Primary Examiner*—Daniel P. Stodola
*Assistant Examiner*—Richard M. Smith
*Attorney, Agent, or Firm*—Howard & Howard

[57] ABSTRACT

An adjustable leg support assembly that includes a cross brace slidably mounted on a center support and projecting laterally therefrom to opposed ends spaced from the center support. An upper clevis is slidably mounted on the center support above the cross brace. A pair of legs each have one end affixed to the upper clevis, a lower end and a center portion affixed to associated ends of the cross brace. An attachment arrangement is selectively mountable at the upper end of the center support for attachment of structure to be supported. The upper clevis may be adjustably affixed to the center support such that the attachment structure on the center support is adjustably positionable with respect to the lower ends of the legs.

22 Claims, 11 Drawing Sheets

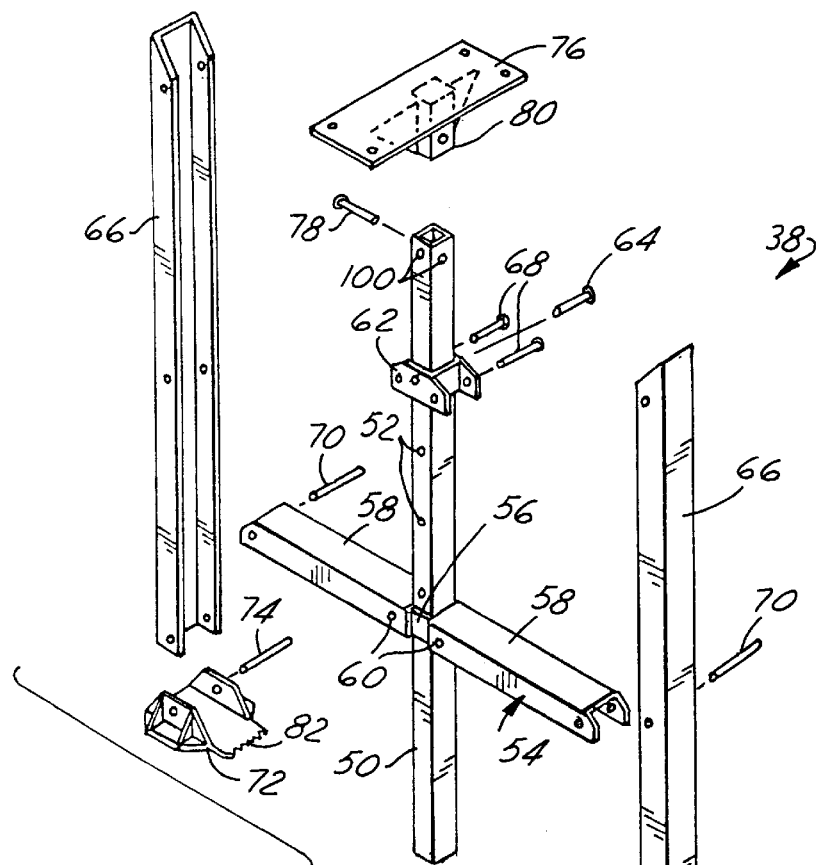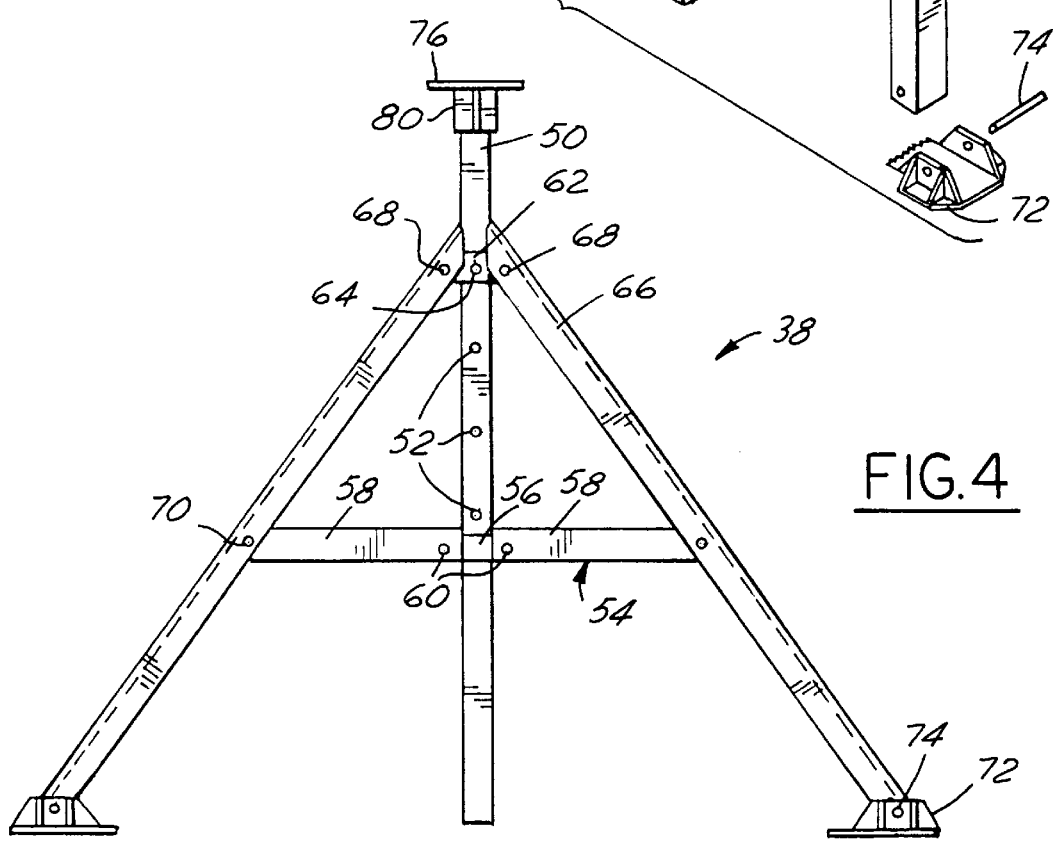

ADJUSTABLE LEG SUPPORT ASSEMBLY

This application is a continuation-in-part of application Ser. No. 08/484,977 filed Jun. 7, 1995, now U.S. Pat. No. 5,651,298, which is a division of application Ser. No. 08/372,824 filed Jan. 13, 1995, now abandoned, which is a continuation of application Ser. No. 08/030,638 filed Mar. 12, 1993, now abandoned, which is a continuation-in-part of application Ser. No. 07/840,319 filed Feb. 24, 1992, now abandoned.

The present invention is directed to portable construction equipment, and more particularly to an adjustable leg support assembly for supporting portable construction equipment such as sheet bending brakes, saw tables, sheet metal slitters and cross beams.

BACKGROUND AND SUMMARY OF THE INVENTION

The building trades extensively employ portable construction equipment, such as saw horses, sheet metal bending brakes, sheet metal slitters and saw tables. A portable saw table is illustrated, for example, in above-referenced parent application Ser. No. 08/848,977. Portable sheet bending brakes are illustrated in U.S. Pat. No. 4,766,757 and copending application Ser. No. 08/268,808. A portable sheet metal slitter is illustrated in U.S. application Ser. No. 08/310,431. All of such applications are assigned to the assignee hereof.

There is therefore a need in the art for a leg support assembly that is sufficiently versatile to be usable in a variety of applications including saw horses, saw tables, sheet bending brakes and sheet metal slitters, that is light in weight, that is sufficiently strong to support heavy loads, that is readily and rapidly vertically adjustable, that folds to compact size for transportation and storage, that is of inexpensive, corrosion-resistant and light-weight construction, and/or that can be provided in the form of a kit for a variety of different support applications. It is an object of the present invention to provide an adjustable leg support assembly that satisfies one or more of these objectives.

An adjustable leg support assembly in accordance with a presently preferred embodiment of the invention includes a cross brace slidably mounted on a center support and projecting laterally therefrom to opposed ends spaced from the center support. An upper clevis is slidably mounted on the center support above the cross brace. A pair of legs each have one end affixed to the upper clevis, a lower end and a center portion affixed to an associated end of the cross brace. An attachment arrangement is selectively mountable at the upper end of the center support for attachment of structure to be supported. The upper clevis may be adjustably affixed to the center support such that the attachment structure on the center support is adjustably positionable with respect to the lower ends of the legs.

The attachment structure in a preferred embodiment of the invention takes the form of a kit that includes a brace for mounting to the upper end of the center support, a plate selectively mountable to the brace for forming a planar support surface, and a yoke selectively mountable to the brace with sidewalls for embracing a 2×4 or other similar wood section of standard dimension. With the planar support affixed to the brace, structures such as a portable sheet bending brake, a portable sheet metal slitter or a portable saw table may be affixed to and supported by the adjustable leg support assembly. With the yoke mounted to the brace, the adjustable leg support assembly may be used in pairs to form a saw horse for supporting structures of any desired character. Alternatively, the attachment structure may be provided in the form of integral and selectively removable elements.

The center support in the preferred embodiments of the invention comprises a length of metallic tube stock, preferably of square cross section. A plurality of through-openings are spaced from each other lengthwise of the center support, and cooperate with a through-opening in the upper clevis for selectively positioning the upper clevis on the center support, preferably by means of a pin that is selectively removable from the upper clevis and center support. The pin in the preferred embodiment of the invention is pivotally mounted on a U-shaped brace having a yoke at the free end of the base for selectively capturing the free end of the pin, and thereby firmly locking the pin in position on the center support and upper clevis. Feet are pivotally mounted at the lower ends of the legs, and include teeth for digging into soil and thereby firmly anchoring the adjustable leg support assembly in position.

The adjustable leg support assembly in accordance with the preferred embodiments of the invention is constructed of strong light-weight anodized aluminum alloy for corrosion resistance and long life. The leg assembly supports heavy loads, up to two thousand pounds. Height adjustments may be readily implemented, over a range of 28 inches to 37 inches in the preferred embodiments of the invention. The leg assembly folds to compact size, preferably a 5 inch by 33 inch size, for convenient handling and storage. The feet of the invention provide support on uneven terrain. Furthermore, the adjustable leg support assembly in accordance with the invention is of inexpensive construction, and the attachment elements may be readily provided in the form of a kit for a variety of support applications.

BRIEF DESCRIPTION OF THE DRAWINGS

The invention, together with additional objects, features and advantages thereof, will be best understood from the following description, the appended claims and the accompanying drawings in which:

FIG. 3 is an exploded perspective view of the adjustable leg support assembly illustrated in FIG. 2;

FIG. 4 is a side elevational view of the adjustable leg support assembly illustrated in FIG. 4;

DETAILED DESCRIPTION OF PREFERRED EMBODIMENTS

Figure 1:
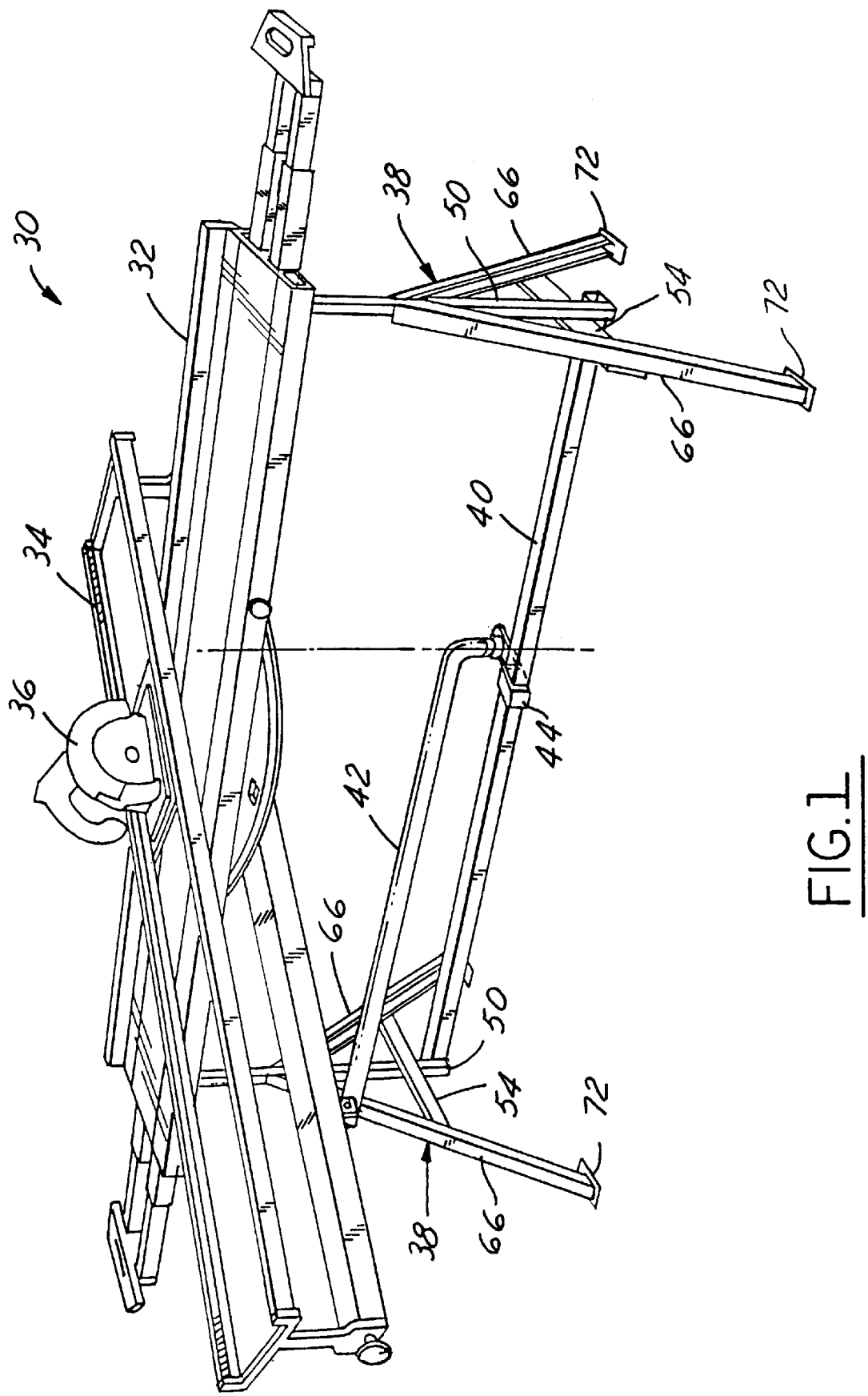
FIG. 1 is a perspective view of a saw horse table mounted on and supported by a pair of adjustable leg support assemblies in accordance with a presently preferred embodiment of the invention.

FIG. 1 illustrates a portable saw table assembly 30 as including a saw table 32 having a saw track 34 for supporting a circular saw 36. Saw table 32 is supported by a pair of spaced leg assemblies 38 interconnected by a cross strut 40. A brace 42 supports saw track 34 at one end, and is pivotally supported at the other end by a brace 44 mounted on cross strut 40. Details of construction of the saw table, to the extent thus far described, are set forth in parent application Ser. No. 08/484,977, which is incorporated by reference for purposes of background.

Referring to FIGS. 1–4, each leg assembly 38 comprises an elongated vertical center support 50, preferably of square aluminum tube stock. Center support 50 has a plurality of openings 52 longitudinally spaced from each other and extending entirely through opposed walls of the support. A cross brace 54 is slidably mounted on center support 50. Cross brace 54 includes a lower clevis 56 having a central portion that externally slidably embraces center support 50 and wings (FIG. 3) projecting laterally therefrom. A pair of horizontal braces 58 are pivotally mounted by associated pins 60 on opposite sides of lower clevis 56 so as to extend laterally outwardly from center support 50. An upper clevis 62 includes a central portion externally slidably mounted on center support 50 and laterally projecting wings (FIG. 3). The central portion of clevis 62 contains opposed through-openings for selective registration with openings 52 in center support 50. A removable pin 64 is selectably insertable through the aligned openings in clevis 62 and center support 50 for mounting clevis 62 in selected position along the center support.

A pair of legs 66 are disposed on laterally opposed sides of center support 50. Each leg 66 has an upper end pivotally affixed by a pin 68 to an associated wing portion of upper clevis 62, and a central portion pivotally affixed by a pin 70 to the outer end of each horizontal brace 58. A pair of feet 72 are affixed by associated removable pivot pins 74 to the lower ends of legs 66. An attachment plate 76 has an integral downwardly projecting sleeve 80 that is externally received over and affixed to the upper end of center support 50 by a removable pin 78. Attachment plate 76 provides a planar upper surface for supporting selected overlying structures, such as saw table base 32 in FIG. 1. The height of attachment plate 76 with respect to feet 72 is adjustable by removing pin 64, selectively adjusting position of center support 50 with respect to clevis 62 and legs 66, and then reinserting pin 64 through aligned openings in clevis 62 and center support 50 when center support 50 and attachment plate 76 are in desired position. Feet 72 have serrated edges 82, which may be pivoted downwardly for digging into the ground and thereby providing steady support on uneven terrain. As noted above, center support 50 is preferably formed of square tube stock. Horizontal side braces 58 and legs 66 preferably are formed of square channel stock. All components of leg assembly 38 preferably are formed of anodized aluminum alloy composition for strength, reduced weight and corrosion resistance.

Figure 2:
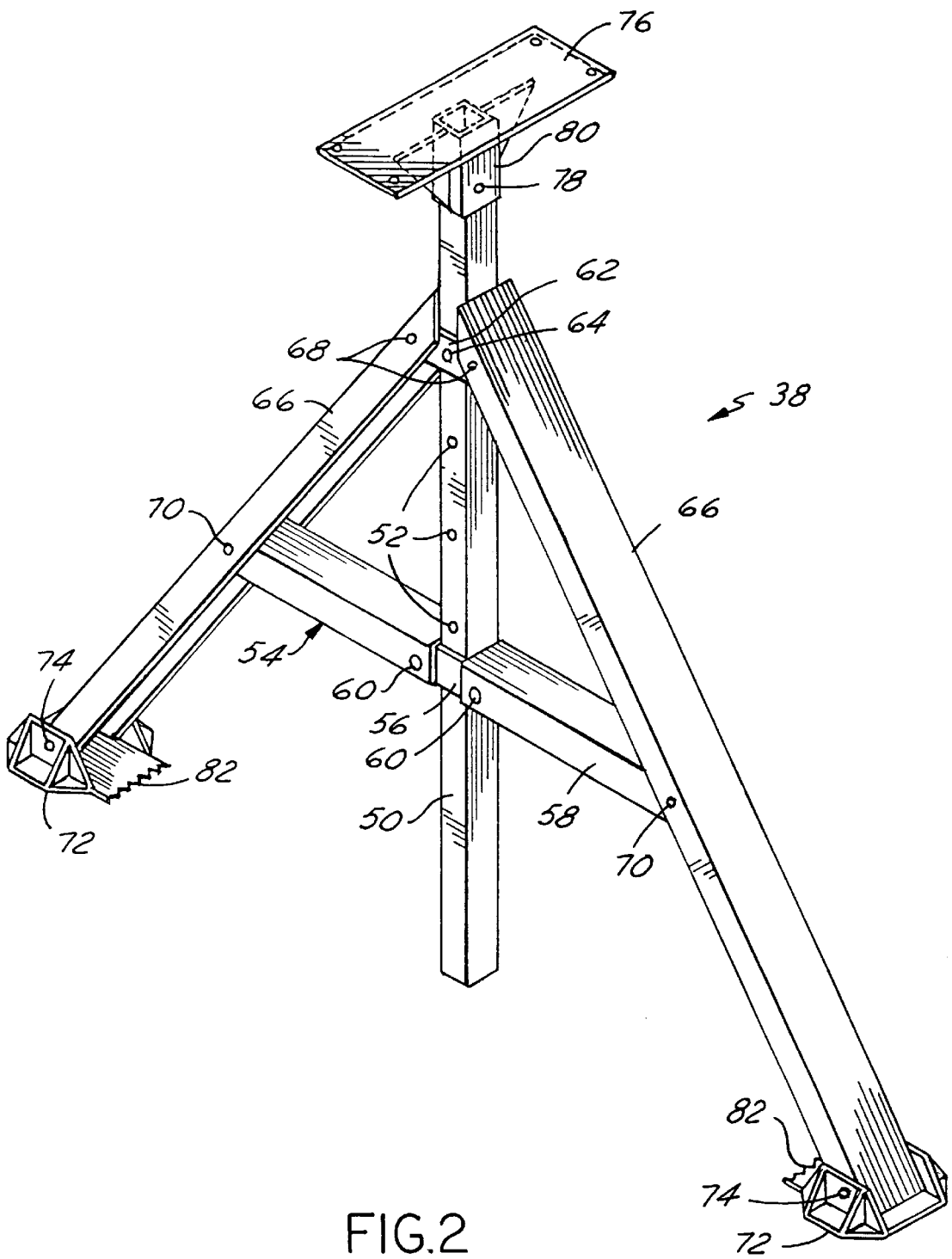
FIG. 2 is a perspective view of an adjustable leg support assembly in accordance with the embodiment of the invention illustrated in FIG. 1.

FIGS. 2 and 4 illustrate leg support assembly 38 ready for use. When not in use, assembly may be folded into itself for compact transport and storage. More specifically, lower clevis 56 may be slid upwardly along support 50 while upper clevis 62 remains in fixed position. As lower clevis 56 is slid upwardly, braces 58 pivot downwardly about pins 60 with respect to clevis 56 and upwardly about pins 70 with respect to legs 66. Legs 66 are thus pivoted inwardly about pins 68. Braces 58 are of lesser width than legs 66, so braces 58 become nested within legs 66. Feet 72 may be pivoted about pins 74 to any desirable orientation.

Figure 5:
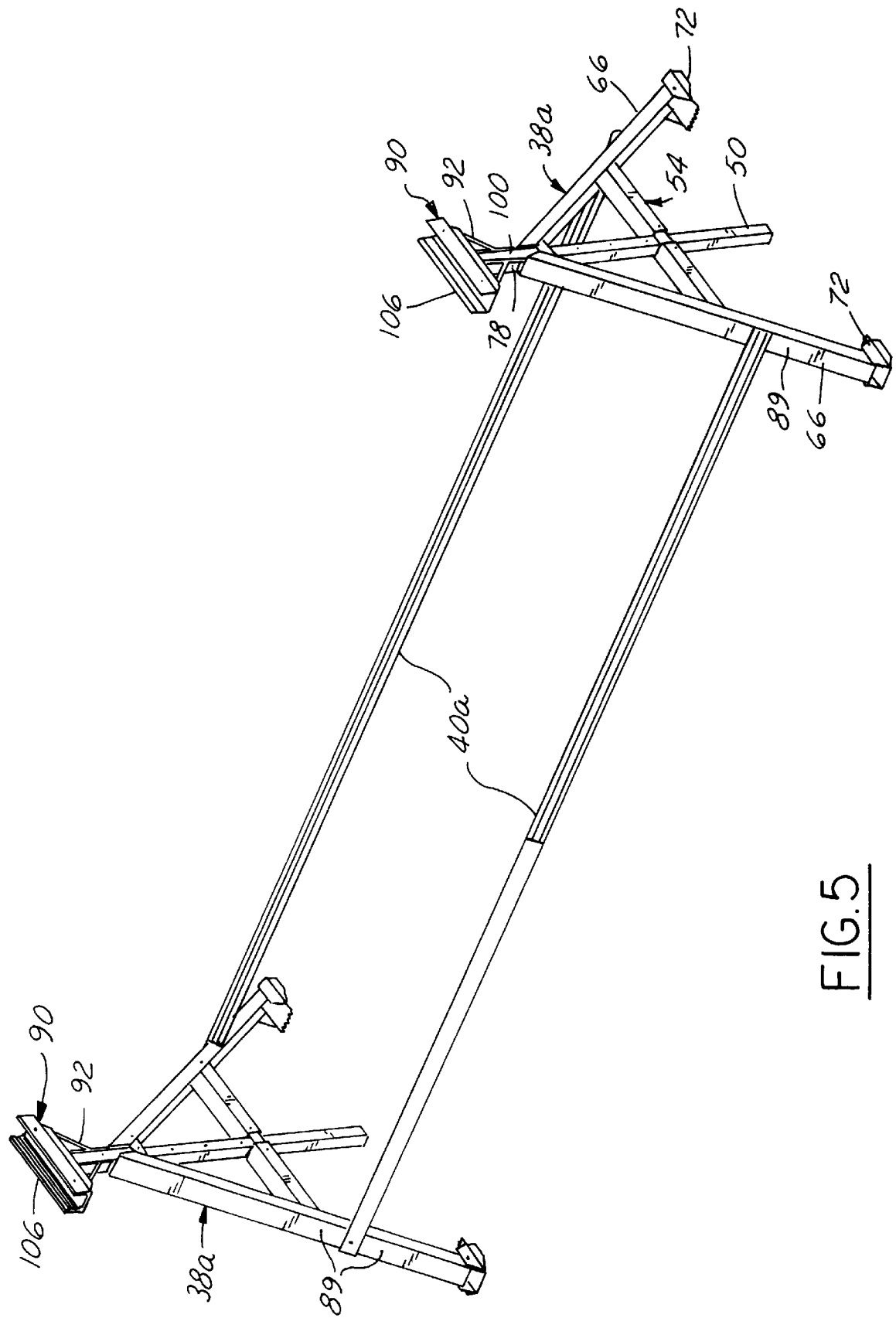
FIG. 5 is a perspective view of a pair of adjustable leg support assemblies in accordance with a modified embodiment of the invention interconnected by a pair of extensible cross struts.

FIG. 5 illustrates a pair of adjustable leg support assemblies 38a interconnected by a pair of adjustably extensible telescoping cross struts 40a. A plurality of spaced openings 89 are provided in each support leg 66 for this purpose. Leg support assemblies 38a are similar to leg support assemblies 38 hereinabove discussed, with the exception that attachment plate 76 in FIGS. 2–4 is replaced by an attachment assembly 90 illustrated in FIGS. 7–9. In particular, each attachment assembly 90 includes a brace 92 (FIG. 9) preferably of one-piece extruded aluminum alloy stock. Brace 92 has a pair of parallel central legs 94 and a integral cross piece 96. Legs 94 are spaced from each other for removable receipt over the end of center support 50. Each leg 94 has a through-opening 98 at the lower end thereof for registry with crossed through-openings 100 (FIG. 3) which open on all four sides of center support 50 adjacent to the upper end thereof. The outer ends of cross piece 96 are connected to legs 94 by inwardly sloping support struts 102. A pair of circular through-openings 104 are effectively formed at each end of cross piece 96 at the junctures with support struts 102.

Figure 8:
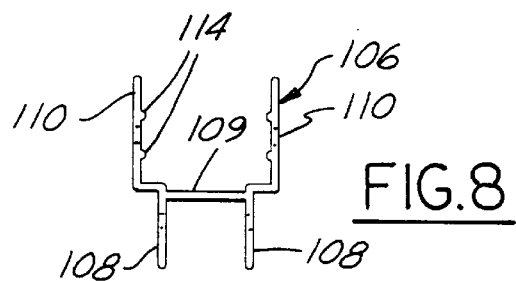
Figure 9:
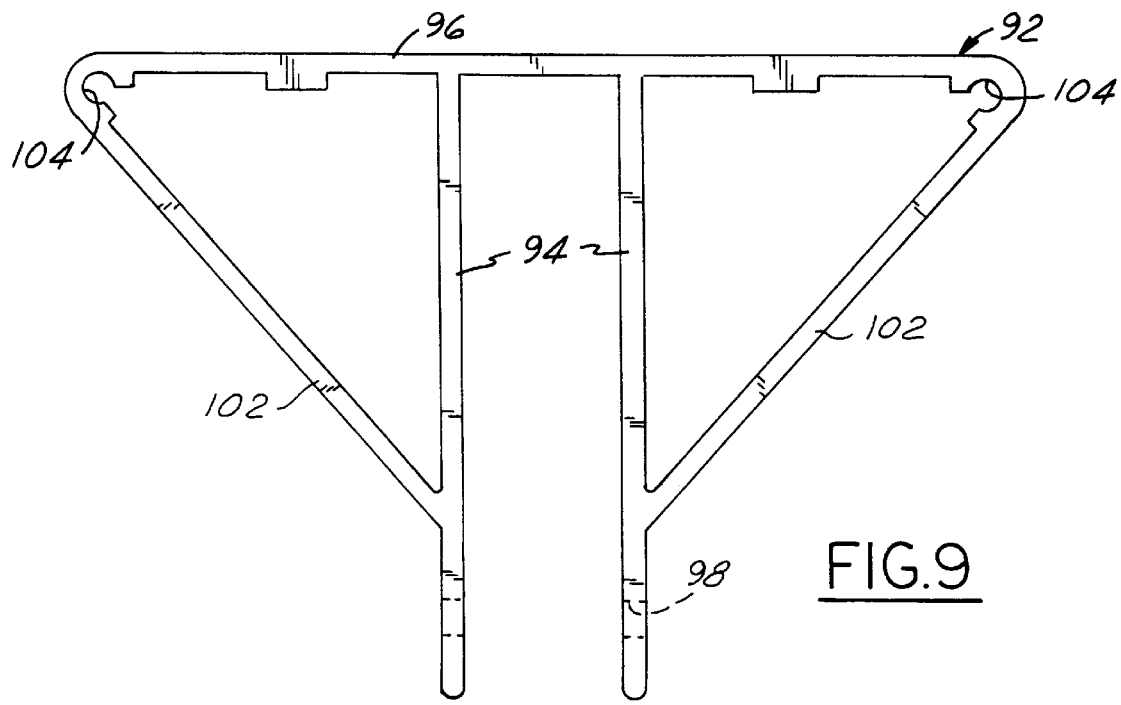
FIG. 9 is a side elevational view of a support brace in the embodiment of the adjustable leg support assembly illustrated in FIGS. 5 and 6.
Figure 15:
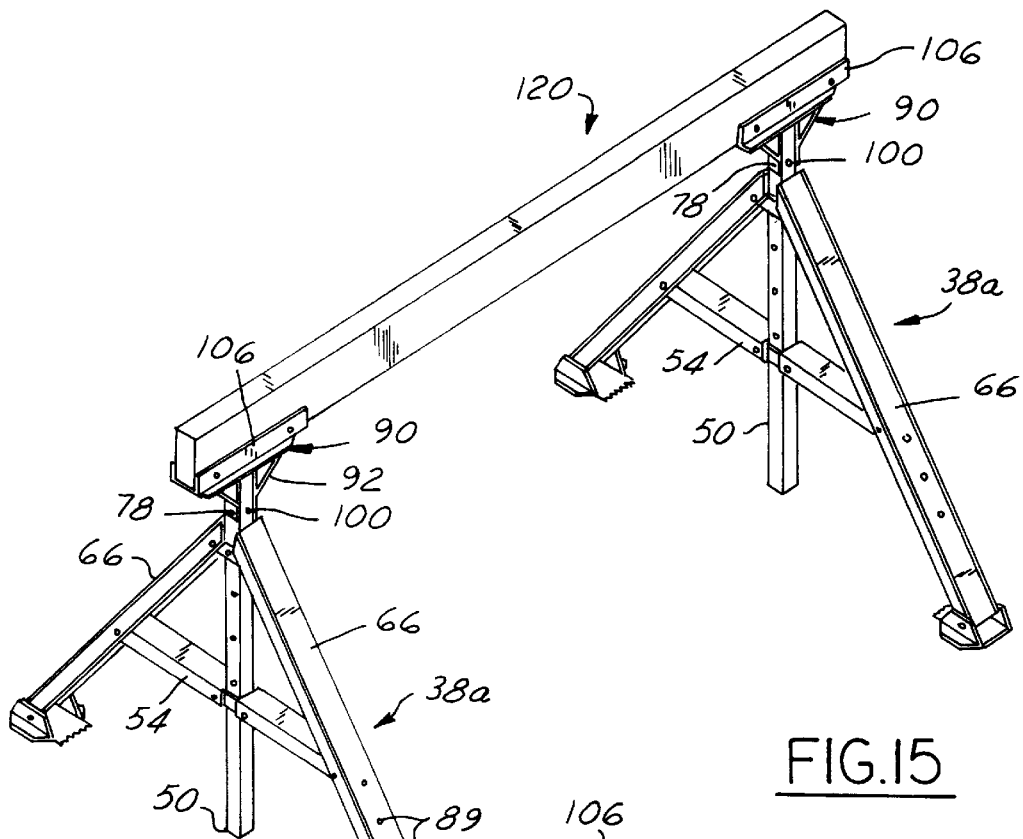
FIG. 15 is a perspective view of the saw horse illustrated in FIG. 14.

Attachment assembly 90 further includes a yoke 106 (FIGS. 7 and 8) of generally H-shaped cross section, having spaced parallel lower plates 108 interconnected by a cross piece 108 with spaced parallel upper plates 110. Lower plates 108 are spaced from each other for removable receipt of brace 92, which is of uniform thickness. Spaced aligned openings 112 extend through lower plates 108, and are spaced from each other for registry in assembly with openings 104 in brace 92 (FIG. 9). Yoke 106 may thus be attached to brace 92 by removable pins or screws that extend through aligned openings 112, 104. Ribs 114 extend inwardly from upper plates 110, which are spaced from each other for edgewise receipt of a 2×4 would support beam (118 in FIG. 15). Ribs 114 help hold the 2×4 beam in position. Openings 116 extend through plate sections 110 for attachment of the 2×4 by screws or the like.

Figure 6:
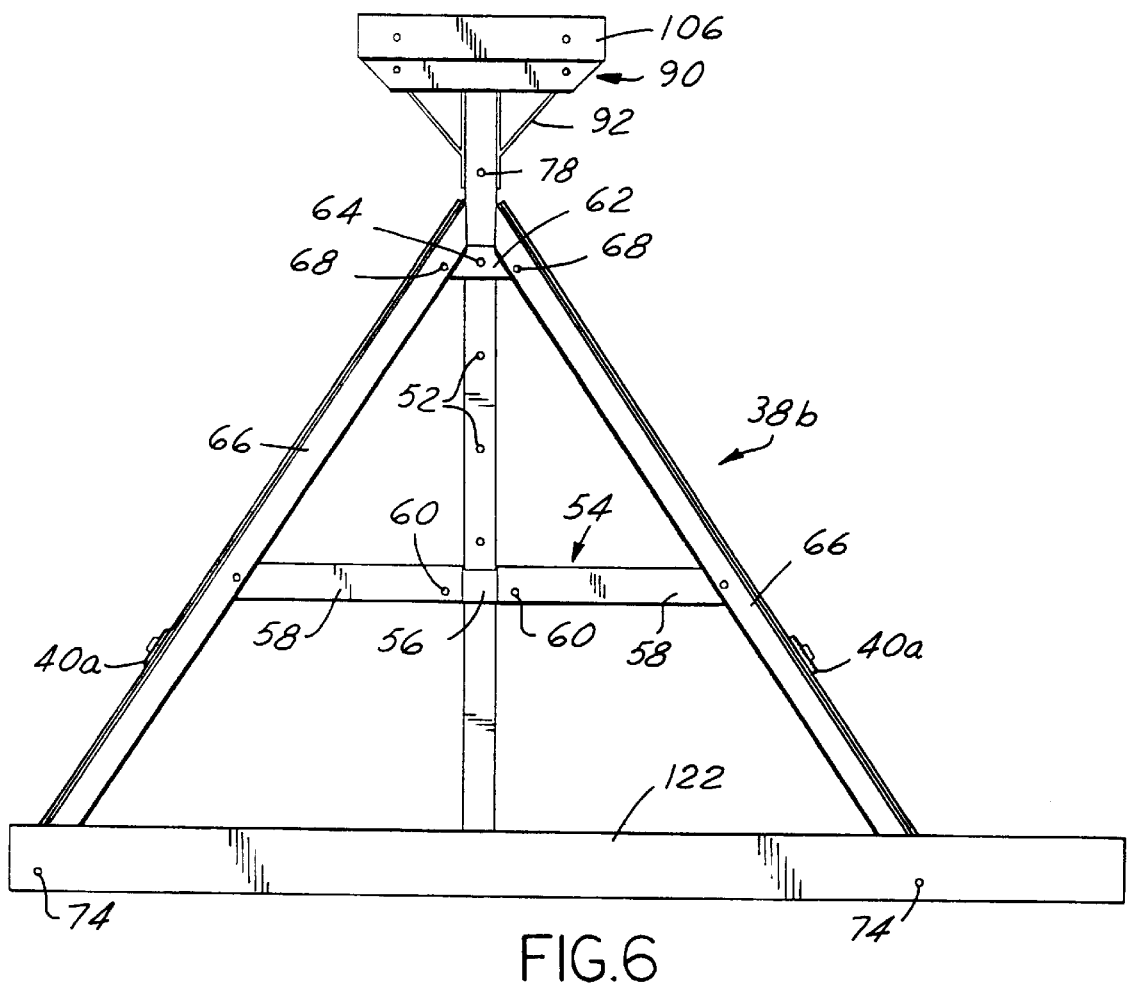
FIG. 6 is a side elevational view of the assembly illustrated in FIG. 5 with a lower support brace.
Figure 16:
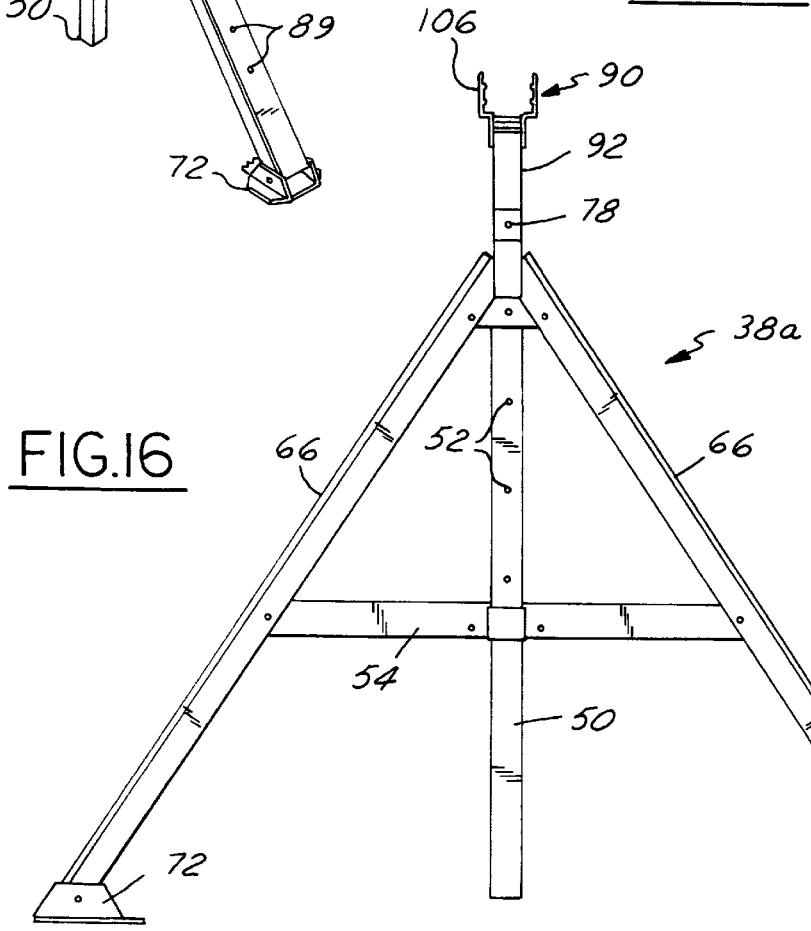
FIG. 16 is a side elevational view of an adjustable leg support assembly in FIGS. 14 and 15.

It will be noted in FIG. 5 that attachment assemblies 90 are affixed to the upper ends of center supports 50 in such a way that yokes 106 are in the planes of legs 66. However, since openings 100 are provided on all four sides of center support 50 as described above, attachment assemblies 90 could also be connected to the upper ends of center supports 50 in such a way that yokes 106 are perpendicular to the planes of support legs 66, such that two leg support assemblies 38a may be employed in connection with a 2×4 support beam 118 (FIGS. 14–16) to form a saw horse assembly 120. FIG. 6 illustrates a modified leg support assembly 38b in which a strut 122 interconnects the lower ends of legs 66 (with feet 72 removed) for additional support. Strut 122 is fastened to legs 66 by pins 74 in the same leg openings that normally mount feet 72.

Figure 10:
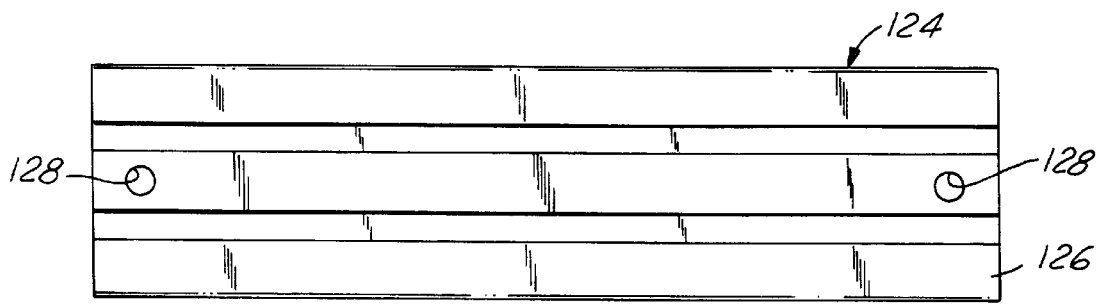
FIGS. 10, 11 and 12 are plan, side and end elevational views of a support member usable in place of the yoke of FIGS. 7 and 8 in the adjustable leg support assembly of FIGS. 5 and 6.
Figure 11:
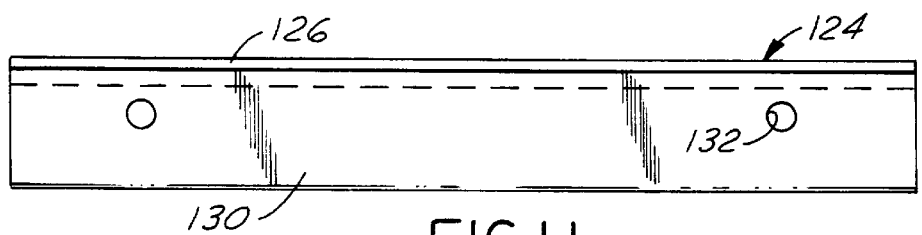
Figure 12:
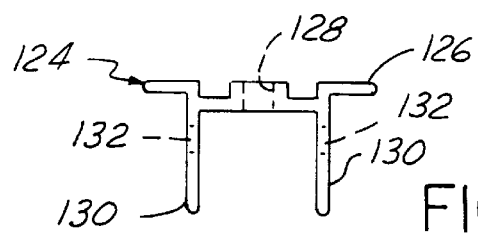
Figure 13:
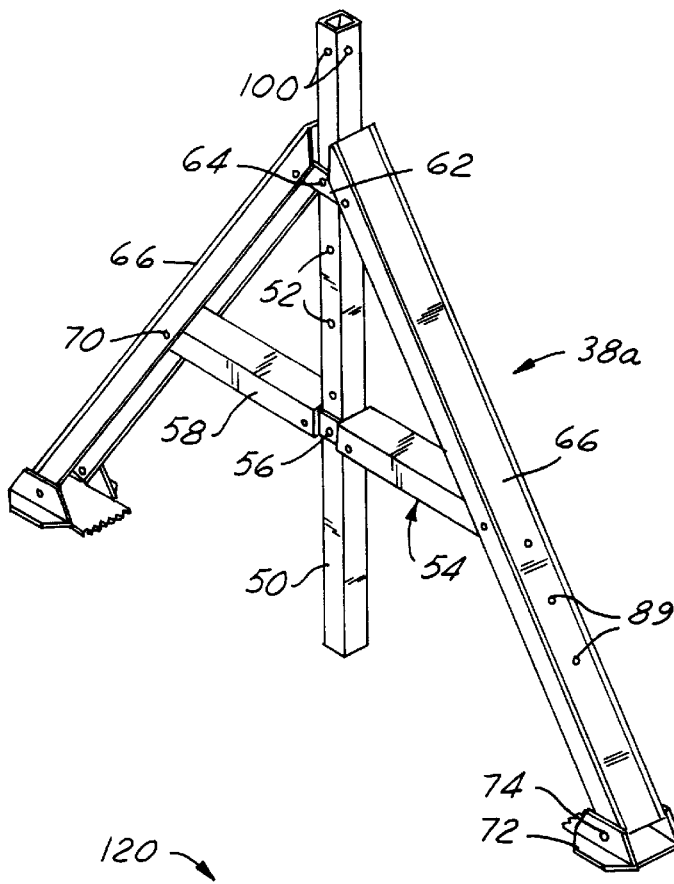
FIG. 13 is a perspective view of an adjustable leg support assembly in accordance with a presently preferred embodiment of the invention before attachment of the support structure on the upper end of the center support.
Figure 24:
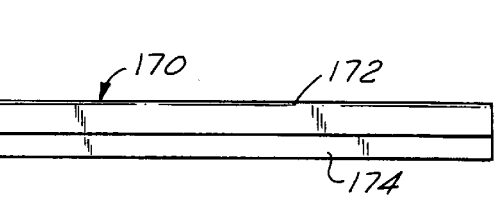
FIGS. 24 and 25 are side and end elevational views of an alternative support member to the embodiment illustrated in FIGS. 10–12.

FIGS. 10–12 illustrate an extruded attachment plate 124 having a center portion and side wings that define a planar upper surface 126 with spaced through-openings 128 for attachment to overlying structure. A pair of downwardly projecting parallel plates 130 are spaced from each other for removable receipt over brace 92 (FIG. 9), and have spaced through-openings 132 for alignment in assembly with openings 104 (FIG. 9) in brace 92. Thus, attachment plate 124 may be used with brace 92 to form a planar support surface for attachment of overlying structure, such as table base 32 of saw table 30 (FIG. 1). This two-piece attachment assembly, including brace 92 (FIG. 9) and plate 124 (FIGS. 10–12), is less expensive than attachment plate 76 (FIGS. 24). Most preferably, brace 92 (FIG. 9), yoke 106 (FIGS. 7–8) and plate 124 (FIGS. 10–12) are all provided with each adjustable leg assembly 38 in the form of a kit for maximum versatility of attachment to structure to be supported. Alternatively, leg support assembly- 38 may be provided as a unit, with brace 92, yoke 90, plate 124, struts 40a (FIG. 5) and struts 122 (FIG. 6) provided as optional accessories.

Figure 14:
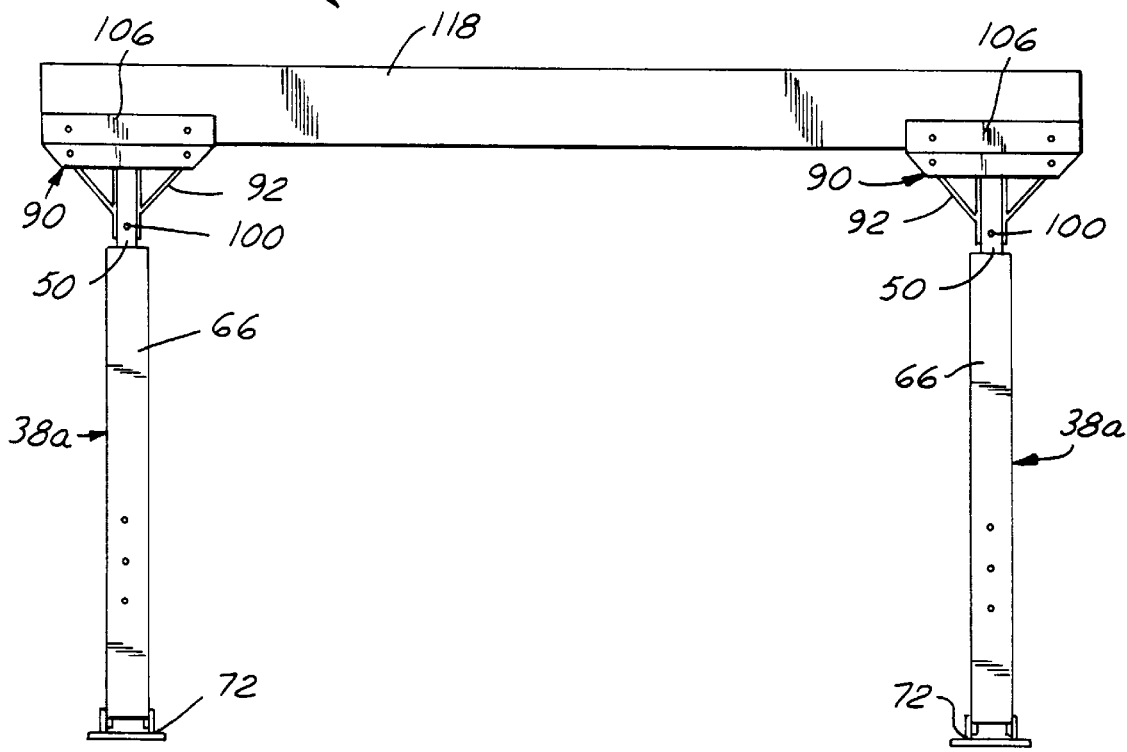
FIG. 14 illustrates adjustable leg support assemblies in accordance with a presently preferred embodiment of the invention configured as a saw horse.
Figure 17:
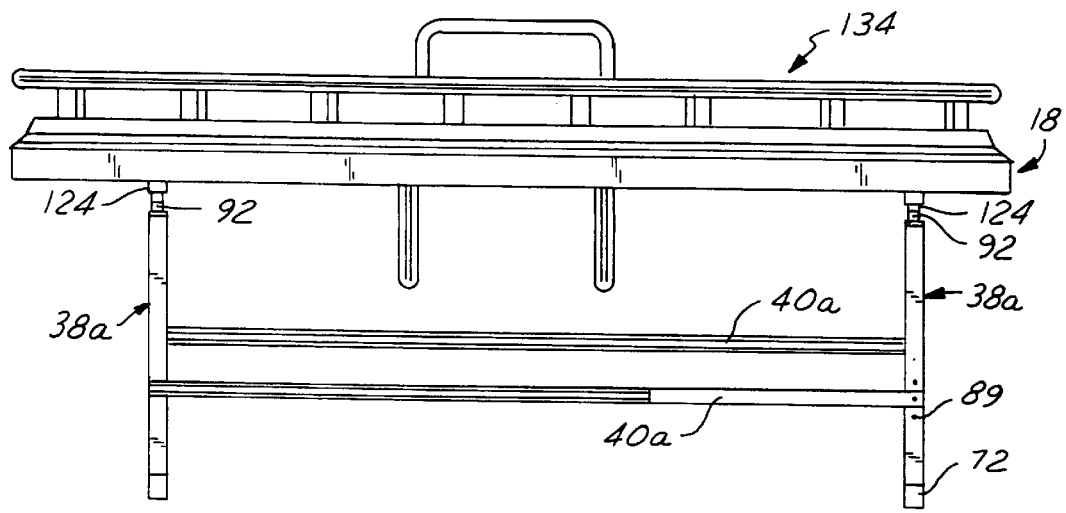
FIG. 17 is a front elevational view of the adjustable leg support assembly of FIG. 5 supporting a portable sheet metal bending brake.
Figure 18:
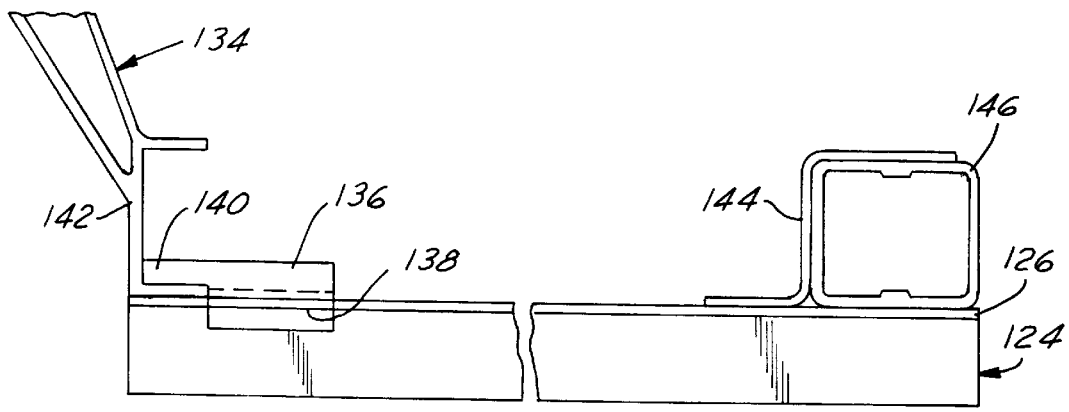
FIG. 18 is a fragmentary end elevational view taken from the direction 18 in FIG. 17.
Figure 19:
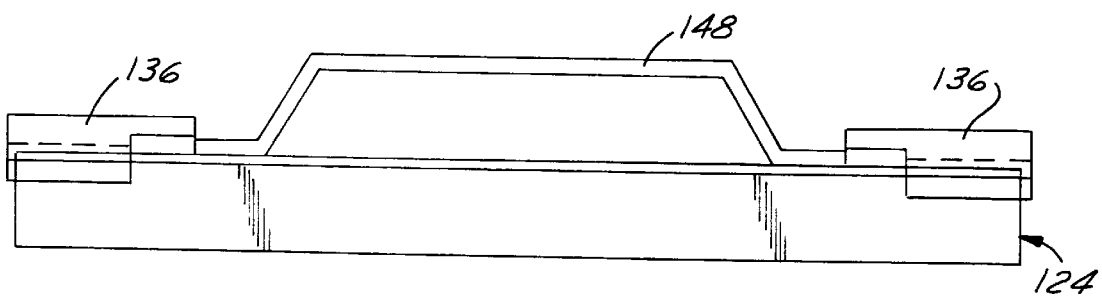
FIG. 19 is a fragmentary end elevational view similar to that of FIG. 18 but showing the adjustable leg support assembly configured for supporting a portable sheet metal slitter.

FIGS. 17 and 18 illustrate a pair of leg assemblies 38a with cross struts 40a in use for supporting a portable sheet bending brake 134 of the type disclosed, for example, in above-referenced U.S. Pat. No. 4,766,757 and application Ser. No. 08/268,808. A retainer clip 136 has side arms 138 that embrace the wings of each support plate 124 and an extending tongue 140 that embraces and captures the forward fixed flange 142 of the bending brake. In the same way, a bracket 144 is affixed to plate 124 (by screws or the like) so as to embrace and capture the rear support rail 146 of bending brake 134. Thus, bending brake 134 is firmly mounted and captured in assembly between a pair of adjustable leg support assemblies 38a. Alternatively, portable sheet bending brake 134 may be provided with brackets for mounting between a pair of saw horses 120 (FIG. 14). FIG. 19 illustrates the same adjustable leg configuration being employed for capturing the base 148 of a portable sheet metal slitter of the type disclosed in the above-referenced application Ser. No. 08/310,431. A pair of retainers 136 are mounted on opposed ends of plate 124 for capturing the lateral edges of sheet metal slitter base 148.

Figure 7:
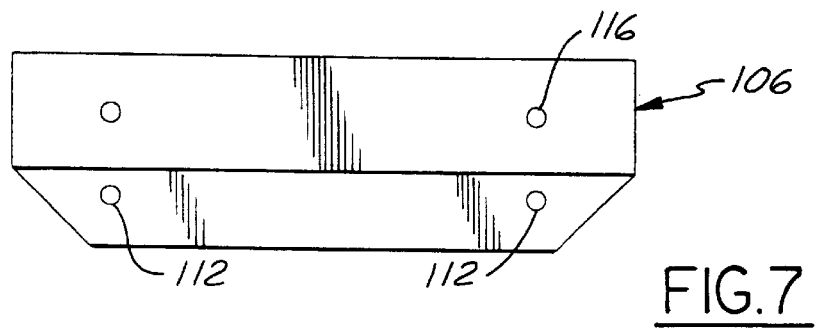
FIGS. 7 and 8 are side and end elevational views of the support yoke in the embodiment of the adjustable leg support assembly illustrated in FIGS. 5 and 6.
Figure 20:
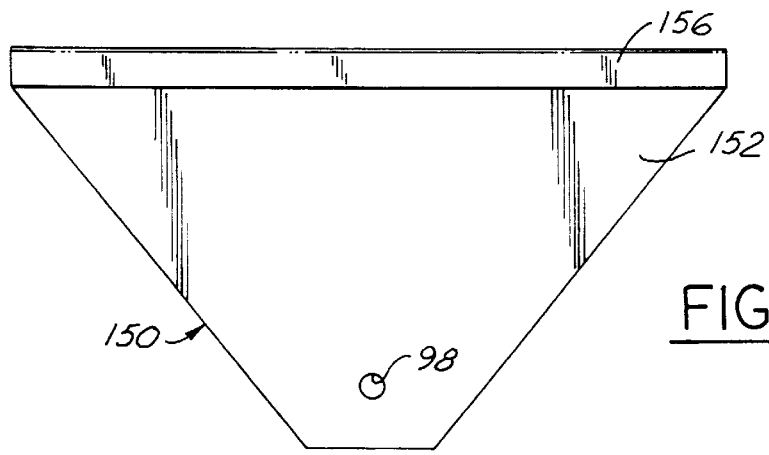
FIGS. 20 and 21 are side and fragmentary end elevational views of an alternative embodiment of the support brace illustrated in FIG. 9.
Figure 21:
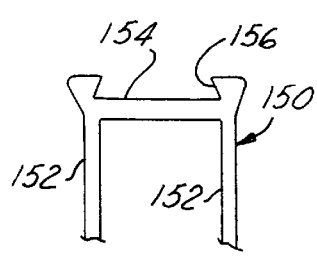
Figure 22:
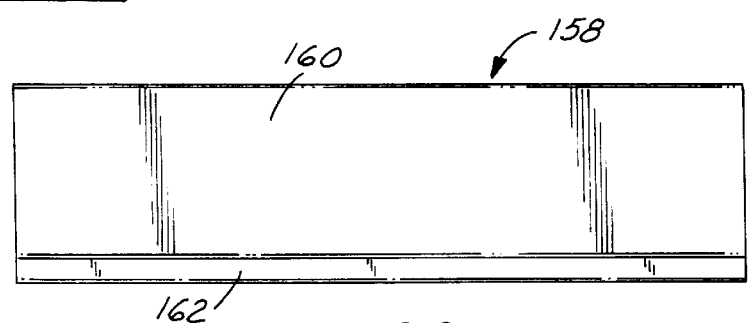
FIGS. 22 and 23 are side and end elevational views of an alternative embodiment of the yoke illustrated in FIGS. 7 and 8.
Figure 23:
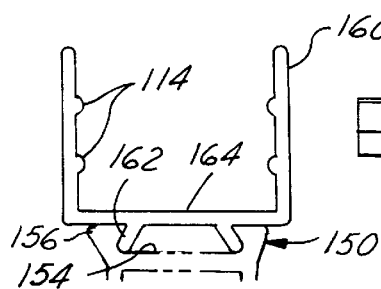
Figure 25:
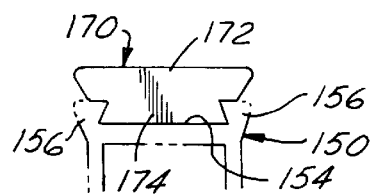

FIGS. 20 and 21 illustrate a brace 150 that may be employed in place of brace 92 illustrated in FIG. 9. Brace 150 is of single-piece extruded aluminum alloy construction, having a pair of spaced parallel side plates 152. Plates 152 are spaced from each other for receipt over the upper end of center support 50, and have openings 98 for affixing the brace to the center support. A longitudinal channel 154 is formed between inwardly bent closed flanges 156 along the upper length of brace 150. FIGS. 22 and 23 illustrate a yoke 158 that may be employed in conjunction with brace 150 (FIGS. 20 and 21) in place of yoke 106 (FIGS. 7 and 8). Yoke 158 is of extruded aluminum alloy construction, having a pair of spaced parallel sides 160 with inwardly extending ribs 114 for engaging a 2×4 beam, and a pair of open flange legs 162 extending along the lower portion 164 of the yoke. Legs 162 are space and angulated for receipt between flanges 156 and channel 154 of yoke 150, as shown in phantom in FIG. 23. FIGS. 24 and 25 illustrate an attachment plate 170, which may be employed in conjunction with brace 150 (FIGS. 20 and 21) in place of attachment plate 124 (FIGS. 10–12). Plate 170 is of elongated extruded aluminum alloy construction, having an upper support portion 172 and a lower portion 174 contoured for receipt between flanges 156 of brace 150, as shown in phantom in FIG. 25.

Figure 26:
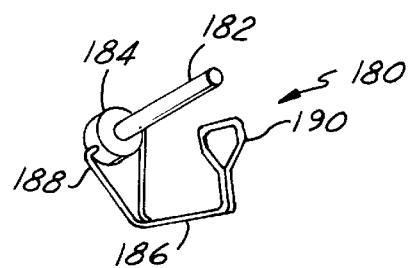
FIG. 26 is a perspective view of a pin assembly in accordance with a presently preferred embodiment of the invention.

FIG. 26 illustrates a pin assembly 180, which may be employed in place of pin 64 (FIG. 3) for adjustably attaching upper yoke 62 to center support 50, or in place of any of the other pins illustrated in FIG. 4. Pin assembly 180 comprises an elongated cylindrical pin 182 having an enlarged head portion 184 at one end thereof. A U-shaped brace 186 of aluminum wire composition includes a closed bite 188 at one end on which pin head 184 is pivotally mounted, and a closed bite 190 at the opposing end for releasably capturing the free end of pin 182. Brace 186 is sufficiently resilient for flexure outwardly to release pin 182 so that pin 182 may be pivoted away from brace 186 for receipt through suitable openings. Then brace 186 may be pivoted back and resiliently flexed until bite 190 is releasably received over the free end of pin 182, so that pin 182 is captured in assembly.

Figure 27:
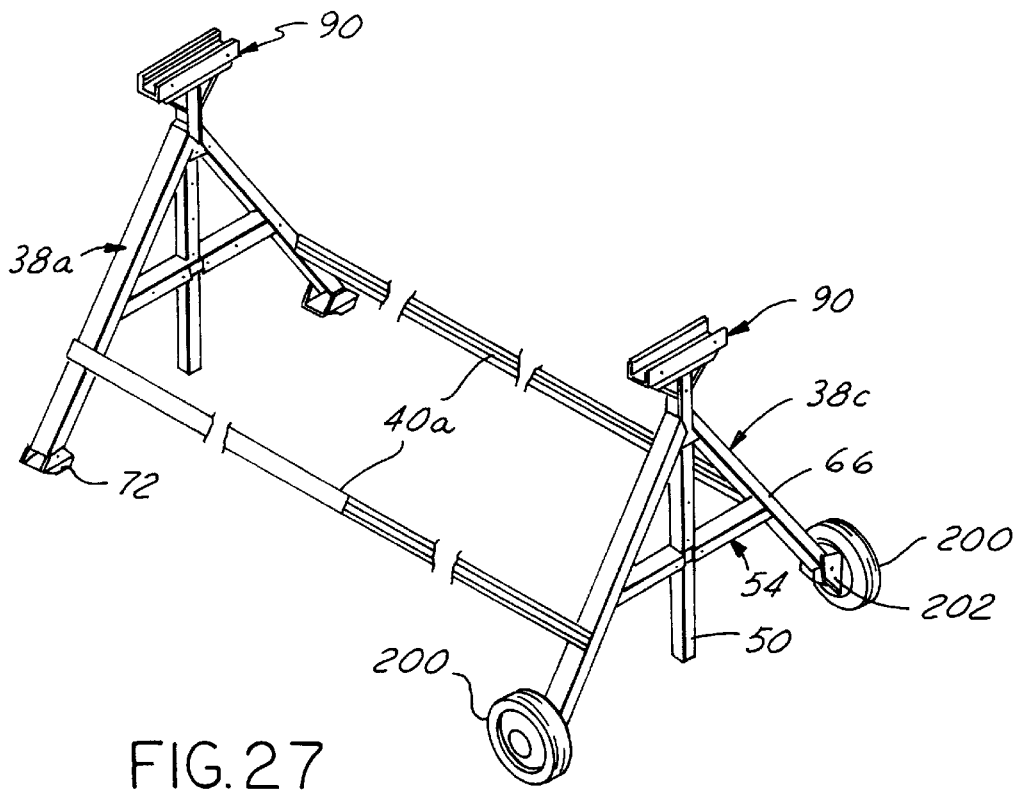
FIGS. 27 and 28 are perspective views of another embodiment of the invention.
Figure 28:
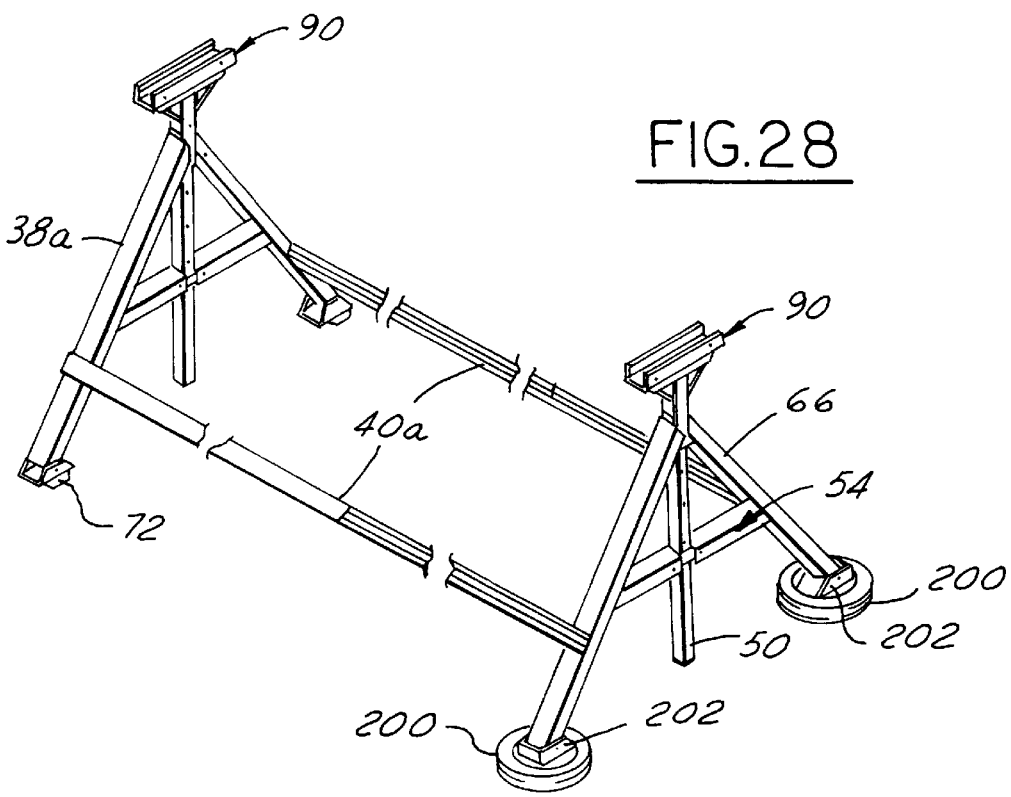

FIGS. 27 and 28 illustrate a modification to FIG. 5, in which one of the assemblies 38a (FIG. 5) is replaced by an adjustable leg support assembly 38c having wheels 200 at the lower ends of each leg 66. Each wheel 200 is rotatably mounted on a bracket 202, which in turn is pivotally mounted to leg 66 instead of feet 72. In the position of FIG. 27 with wheels 200 vertical, the assembly (and anything carried thereon) may be freely moved around the job site. Wheels 200 may be pivoted to the horizontal position (FIG. 28) to provide a stable assembly. Wheels 200 and brackets 202 may be provided as manufactured or as an after-market add-on.

We claim:

1. An adjustable leg support assembly that comprises:

a center support having an axis extending between an upper end and a lower end, a cross brace slidably mounted on said center support and projecting laterally therefrom to opposed ends spaced from said center support, an upper clevis slidably mounted on said center support such that said center support is selectively axially moveable relative to said upper clevis, a pair of legs each having one end affixed to said upper clevis, a lower end and a center portion, each said opposed end of said cross brace being connected with one of said leg center portions, attachment means at the upper end of said center support for attachment of structure to be supported, means for adjustably affixing said upper clevis to said center support, such that said attachment means on said center support is adjustably positionable with respect to said lower ends of said legs, wheels rotatably mounted at the lower end of each said leg, and means for pivotally mounting said wheels to said legs for selective pivotal motion between a vertical orientation wherein said wheels can roll along a surface and a horizontal orientation wherein said wheels are generally parallel to a support surface for stably supporting said legs.

2. The assembly set forth in claim 1, wherein said attachment means comprises a planar support surface perpendicular to said center support.

3. The assembly set forth in claim 2 wherein said attachment means comprises a hollow sleeve for receipt over said upper end of said center support and a plate affixed to said sleeve.

4. The assembly set forth in claim 2 wherein said attachment means comprises a brace for removable attachment to said upper end of said center support, and means for removable attachment to said brace to form a planar support surface.

5. The assembly set forth in claim 4 further comprising retainer means selectively mountable on said removable attachment means for capturing structure to be supported on said removable attachment means.

6. The assembly set forth in claim 5 wherein said retainer means comprises means for mounting a sheet metal bending brake on said attachment means.

7. The assembly set forth in claim 5 wherein said retainer means comprises means for mounting a sheet metal slitter on said attachment means.

8. The assembly set forth in claim 5 wherein said retainer means comprises means for mounting a saw table on said attachment means.

9. The assembly set forth in claim 1 wherein said attachment means comprises a brace for removable attachment to said upper end of said center support, and a yoke for removable attachment to said brace and having spaced sides for capturing a support beam therebetween.

10. The assembly set forth in claim 1 wherein said attachment means comprises a brace for removable attachment to said upper end of said center support, means for selective removable attachment to said brace to form a planar support surface, and a yoke for selective removable attachment to said brace and having spaced sides for receiving a support beam therebetween.

11. The assembly set forth in claim 10 wherein said brace, said removable-attachment means and said yoke are all of extruded metallic construction.

12. The assembly set forth in claim 10 wherein said attachment means further comprises retainer means selectively mountable on said removable attachment means for capturing structure to be supported on said removable attachment means.

13. The assembly set forth in claim 1 wherein said means for adjustably affixing said upper clevis to said center support comprises an opening extending through said upper clevis, a plurality of openings spaced from each other lengthwise of said center support for selective alignment with said opening in said upper clevis, and means for extending through aligned openings in said upper clevis and said center support for affixing said upper clevis in position along said center support.

14. The assembly set forth in claim 13 wherein said center support is of metallic tubular construction.

15. The assembly set forth in claim 14 wherein said tubular construction is of square cross section.

16. The assembly set forth in claim 13 wherein said means for extending through aligned openings in said upper clevis and said center support comprises pin means for removable receipt in said aligned openings.

17. The assembly set forth in claim 16 wherein said pin means includes means for releasably locking said pin means in position.

18. The assembly set forth in claim 17 wherein said pin means includes a U-shaped brace having spaced free ends, and a pin pivotally mounted at one end to one free end of said brace.

19. The assembly set forth in claim 18 wherein said U-shaped brace is of flexible construction and has means on the other free end of said brace for releasably capturing the other end of said pin.

20. The assembly set forth in claim 1 wherein said cross brace comprises a lower clevis slidably mounted on said center support, and a pair of laterally extending braces each pivotally connected at one end to said lower clevis and at the other end to the center portion of an associated leg.

21. The assembly set forth in claim 20 wherein said legs and said braces are constructed such that said braces fold with respect to said lower clevis and nest within said legs, and said legs fold against said center support, as said lower clevis is slid along said center support toward said upper clevis.

22. An adjustable leg support assembly, comprising:

a pair of legs having first and second ends;

a connecting member having a central portion and connecting portions, said first ends of said legs being pivotally connected to said connecting portions;

a cross brace member having opposite ends connected to said legs, respectively, at a location between said first and second ends of said legs, said cross brace member having a central portion;

a center support member having an axis extending between a first and second end, said center support member being slidably received by said connecting member central portion and said cross brace member central portion;

a locking member that locks said center support member in a selected position relative to said connecting member such that said center support member is selectively axially moveable to adjust a distance between said center support member first end and said connecting members;

a support member pivotably connected to each said leg adjacent said second end of each said leg, each said support member having a first support surface that engages a base surface beneath said assembly when said support member is pivoted into a first position relative to said leg and a second support surface that engages the base surface when said support member is pivoted into a second position relative to said leg and wherein said second support surface has a smaller dimension than said first said support surface; and wherein said support members comprise wheels, each said first support surface is a face of said wheel and each second support surface is a rounded edge on said wheel.

\* \* \* \* \*